US009734188B1

(12) United States Patent
Kashalikar et al.

(10) Patent No.: US 9,734,188 B1
(45) Date of Patent: Aug. 15, 2017

(54) SYSTEMATIC APPROACH TO DETERMINE SOURCE OF DATA QUALITY ISSUE IN DATA FLOW IN AN ENTERPRISE

(71) Applicant: INTERNATIONAL BUSINESS MACHINES CORPORATION, Armonk, NY (US)

(72) Inventors: Kunjavihari M Kashalikar, Littleton, MA (US); Cassio S. D. Santos, Littleton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/344,738

(22) Filed: Nov. 7, 2016

Related U.S. Application Data

(63) Continuation-in-part of application No. 15/011,244, filed on Jan. 29, 2016, now Pat. No. 9,547,686.

(51) Int. Cl.
*G06F 17/30* (2006.01)
(52) U.S. Cl.
CPC .. *G06F 17/30371* (2013.01); *G06F 17/30516* (2013.01); *G06F 17/30958* (2013.01)

(58) Field of Classification Search
None
See application file for complete search history.

(56) References Cited

U.S. PATENT DOCUMENTS

| 8,983,914 | B2 | 3/2015 | Kung et al. | |
| 2012/0179510 | A1* | 7/2012 | Adler | G06Q 10/06 705/7.36 |
| 2014/0279934 | A1 | 9/2014 | Li et al. | |

* cited by examiner

*Primary Examiner* — Belix M Ortiz Ditren
(74) *Attorney, Agent, or Firm* — Shimokaji IP

(57) ABSTRACT

A method may include applying periodically a data validation rule to data transformed through a data processing system, wherein the data validation rule applies aspects selected from a group consisting of data value range, specific data values, and relationship with other data entries; responsive to detecting a violation of the data validation rule, identifying a portion of the transformed data for lineage assessment; examining the identified transformed data iteratively upstream at a previous transformation node in a lineage graph, until the method detects a node where the violation of the data validation rule can't be reproduced; creating a separate node in a distributed network for each of the previous transformation nodes in the lineage graph; and identifying the separate node in the distributed network introducing the violation of the data validation rule.

1 Claim, 1 Drawing Sheet

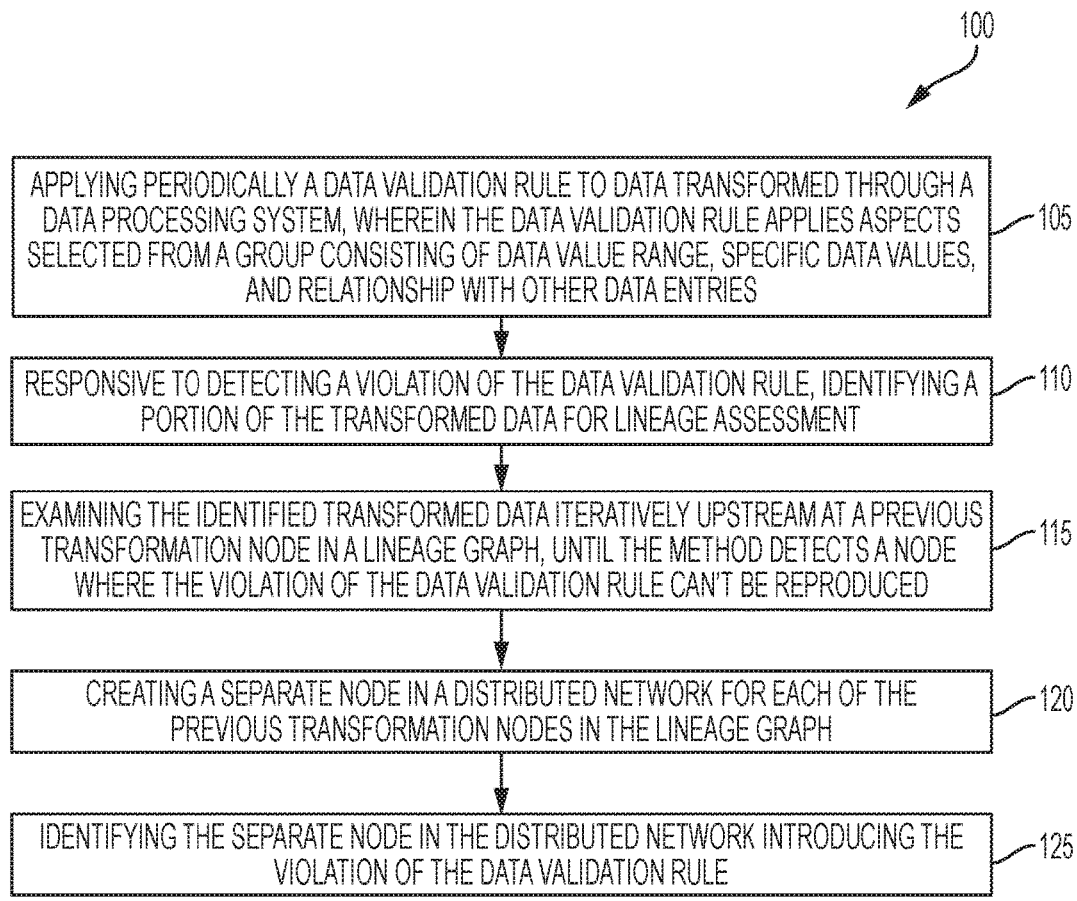

SYSTEMATIC APPROACH TO DETERMINE SOURCE OF DATA QUALITY ISSUE IN DATA FLOW IN AN ENTERPRISE

This application is a continuation-in-part of parent application Ser. No. 15/011,244 and claims priority benefit to that application.

BACKGROUND OF THE INVENTION

The present invention generally relates to data quality. More particularly, the present invention relates to determining quality of data at a destination.

Data can contain errors after arriving at a destination from a source. It is important to determine the quality of data that has arrived at a destination.

As can be seen, there is a need for a method for determining quality of data at a destination.

SUMMARY OF THE INVENTION

In one aspect, a method may include applying periodically a data validation rule to data transformed through a data processing system, wherein the data validation rule applies aspects selected from a group consisting of data value range, specific data values, and relationship with other data entries; responsive to detecting a violation of the data validation rule, identifying a portion of the transformed data for lineage assessment; examining the identified transformed data iteratively upstream at a previous transformation node in a lineage graph, until the method detects a node where the violation of the data validation rule can't be reproduced; creating a separate node in a distributed network for each of the previous transformation nodes in the lineage graph; and identifying the separate node in the distributed network introducing the violation of the data validation rule.

These and other features, aspects and advantages of the present invention will become better understood with reference to the following drawings, description and claims.

BRIEF DESCRIPTION OF THE DRAWINGS

The FIGURE is a depiction of a workflow containing detailed textual description of a step which is then repeated.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a method of identifying a root cause of a data quality issue in a data flow.

In the FIGURE, a method 100 may include a step 105 of applying periodically a data validation rule to data transformed through a data processing system, wherein the data validation rule applies aspects selected from a group consisting of data value range, specific data values, and relationship with other data entries. A step 110 may include responsive to detecting a violation of the data validation rule, identifying a portion of the transformed data for lineage assessment. A step 115 may include examining the identified transformed data iteratively upstream at a previous transformation node in a lineage graph, until the method detects a node where the violation of the data validation rule can't be reproduced. A step 120 may include creating a separate node in a distributed network for each of the previous transformation nodes in the lineage graph. A step 125 may include identifying the separate node in the distributed network introducing the violation of the data validation rule.

In an embodiment, the method 100 may include upstream tracking movement of data, using lineage, inspecting and comparing data rule results at successive predecessor of data destination and identifying an earliest step in data movement where a problem manifests itself. The method 100 may present details to a data quality expert to determine a right point in data movement to apply a remedy to insure a data issue is fixed.

In an embodiment, the method 100 may use data rules to validate data sources and flag records that are an exception to a data rule. A lineage graph can store details of data movement and transformation from source to target, with each node of the graph representing a successive state of the data during its movement. Data rule executions, if carried out along intermediate stopping points of data movements, can have the ability to store results in a Data Quality Exception Database. When data storage is assessed for data quality, it can generate a set of exception records, which may contain details of a quality issue at the record level, including details such as columns where the error may manifest, such as primary key of a table.

In an embodiment, the method 100 may start with a data source where an execution of a data rule created an exception. As an example, the data source may be a data destination of a data processing workflow. A data source may be taken under inspection, to review data fields that have errors. Following a lineage graph, at every predecessor node where data is moved from or transformed from, the method 100 may evaluate a result of data rule validation, either using exception records available for the data source or by using a sampling strategy and evaluating data rule against the samples. The method 100 may compare the result, and determine if within the two nodes, whether the previous node had better quality or not. If the predecessor node has equal or better quality, then the successor node may be where the problem occurred or the problem may have occurred during transformation between the two nodes. In an embodiment, sample exception records may be evaluated, and the exception records may contain primary key values that may allow specific rows to be traced upstream and the data validation rule to be re-evaluated to confirm that a violation of the data validation rule is still detected for the same rows. In another implementation, if data rule validation details are not available, the method 100 using a sampling mechanism, can validate a predecessor node for data errors. The method 100 can allow an organization to remediate data quality issues at an earliest point in the life cycle of data.

In an embodiment, the method 100 may generate an exception from running an operational data quality rule (data rules which can be associated with a governance rule). In an embodiment, a lineage graph may be traversed upstream, starting from an asset that a rule ran against and an exception was reported on (may be a column in a table that was bound to a rule variable). A goal may be to run the same operational rules at each step, or adapted rules, with the added ability to trace where the data collected in reported exception records is coming from when attempting to retro-fit a rule to multiple sources. This may allow detection of a point in a work flow where a reported exception or something contributing to that exception is taking place, so that the problem can be fixed/addressed at the root. This process can be repeated for all work flows involving an asset in question, or for all exceptions involving columns contributing to a given report. This can allow, for instance, a problem in a data table column that stems from bad or missing values in a reference table accessed upstream to be handled by fixing a reference table, with the option to assign the same/adapted operational rule to that asset.

In an embodiment, the method 100 may find records that do not pass validation criteria, and may produce an exception record, which may highlight data errors in a data source under inspection. When an exception is reported and prioritized, the exception may be evaluated with a data rule to determine a type of error and a data field that fails validation criteria. A data source may be inspected to review lineage information. Lineage information can be used to identify a graph that depicts movement of data to its destiny. The method 100 may trace a graph from a destination upstream (lineage) and determine quality or exceptions to quality at every node in the graph. The method 100 may be applied to any data asset node in a data processing workflow where rule violations were detected. Using details in an exception set generated by data rules in a Data Rule engine or applying sampling, the method 100 may determine what is the earliest node in the lineage graph, where the quality issue was introduced. Either the details may be available in exception records stored in the Data Quality Exception Database (including primary key values), or sampling can be used to reproduce violations.

In an embodiment, the method 100 may determine if each node in the lineage graph was subjected to a related data rule. The results from an executed data rule may be used to compare results from a predecessor node and successor node to the executed data rule and identify if either the predecessor or successor node was the original node where a data problem was introduced. If a node does not have data rule applied to it, the method 100 may create a data rule using a data rule at the successor node and the transformation applied when moving data to the successor node.

In an embodiment, at an end of the process, the method may identify an earliest point in the data movement pipeline where the data issue was introduced, allowing an organization to solve an issue at a source, avoiding all the issues that occur in later parts of the data movement pipeline.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for identifying a root cause of a data quality issue in a data flow, the computer program product comprising a computer readable storage medium having program instructions embodied therewith, the program instructions executable by a computer to cause the computer to:
apply periodically a data validation rule to data transformed through a data processing system,
wherein the data validation rule applies aspects selected from a group consisting of data value range, specific data values, and relationship with other data entries;
responsive to detecting a violation of the data validation rule, identify a portion of the transformed data for lineage assessment;
identify a node in a lineage graph;
determine, for each of a plurality of other nodes in the lineage graph, whether the data transformed through the data processing system has been moved from one of the plurality of other nodes in the lineage graph, or the data transformed through the data processing system has been transformed at the one of the plurality of other nodes in the lineage graph;
create exception records that record exception properties of the data transformed through the data processing system, wherein the created exception records are created in response to execution of the data validation rule producing an exception;
examine the identified transformed data iteratively upstream at a previous transformation node from the identified node in the lineage graph where the identified transformed data is moved from or transformed from the previous transformation node, until the method detects a node where the violation of the data validation rule can't be reproduced;
select a plurality of the exception records as sample records;
determine whether the identified node in the lineage graph or the previous transformation node contains the violation of the data violation rule; and
determine that a root cause of a data quality issue was created between the identified node in the lineage graph and the previous transformation node in response to the previous transformation node having equal or less occurrences of the violation of the data violation rule than the identified node in the lineage graph.

* * * * *